3,803,207
PROCESS FOR THE PREPARATION OF
β-ETHYLENIC NITRILES
Jacques Tellier and Jean-Henry Blanc, Pau, and Robert Voirin, Mouren, France, assignors to Societe Nationale des Petroles d'Aquitaine, Courbevoie, France
Filed Mar. 1, 1972, Ser. No. 230,659
Claims priority, application France, Mar. 5, 1971, 7107710
Int. Cl. C07c 121/02
U.S. Cl. 260—465.3                   9 Claims

ABSTRACT OF THE DISCLOSURE

A process for preparing β-ethylenic nitriles, particularly methacrylonitrile, by oxidizing the corresponding olefins, in the presence of ammonia and a catalyst, the active part of which contains molybdenum, iron and tellurium oxides, in the proportions of 1 to 15% $MoO_3$, 25 to 50% $Fe_2O_3$, and 45 to 70% $TeO_3$.

Figure 1:
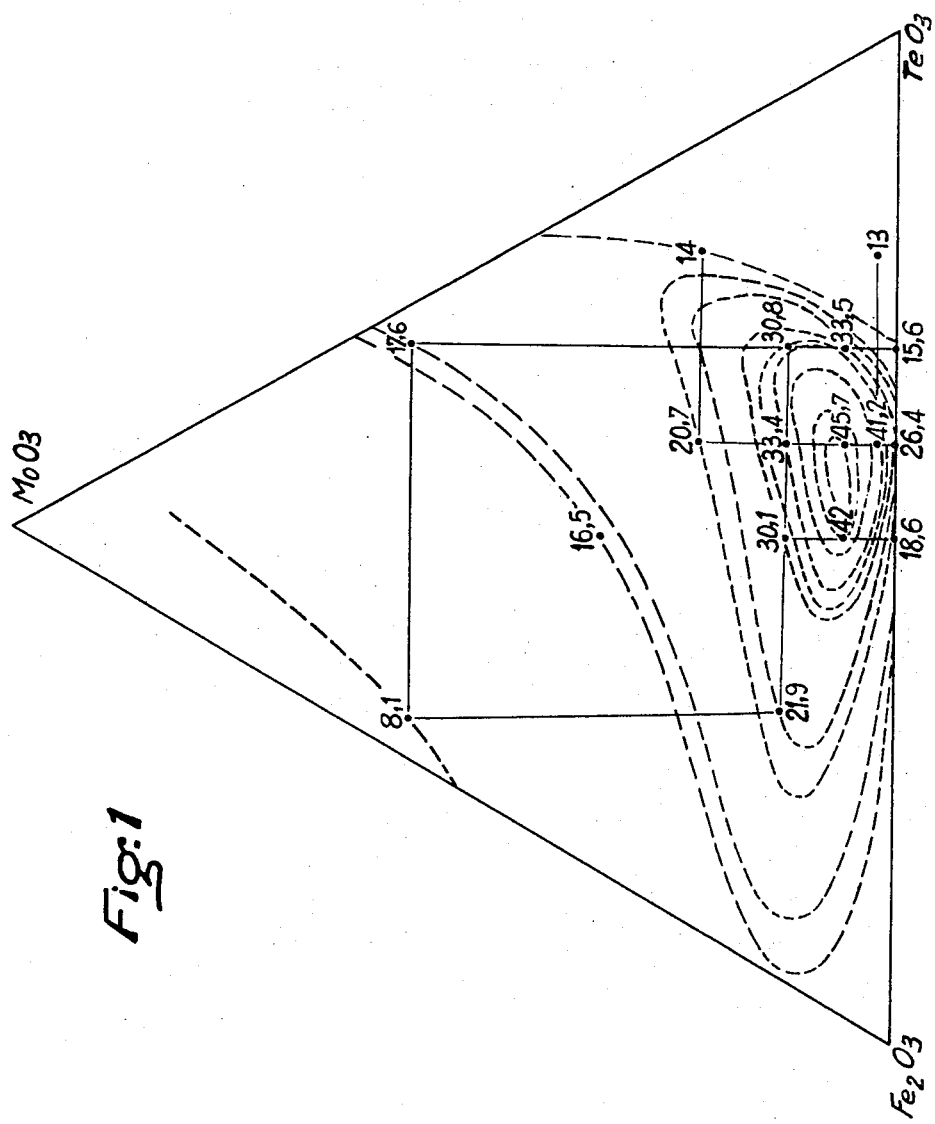

Methacrylonitrile is a very useful raw material for producing methacrylate.

---

This invention concerns a new catalytic composition used in preparing β-ethylenic nitriles by oxidizing the corresponding olefins in the presence of ammonia, and particularly the process for preparing methacrylonitrile from isobutylene.

Methacrylonitrile is a very useful industrial monomer that can be polymerized on its own, or copolymerized, especially with styrene.

In addition, isobutylene is obtained in large quantities as a by-product of the steam-cracking of petroleum cuts. It is therefore useful to be able to convert it economically into an industrial product.

Various catalysts exist already for the oxidation by means of ammonia, or ammonoxidation, of isobutylene to produce methacrylonitrile, but so far it has not been possible to obtain adequate methacrylonitrile yields. Because of the great reactivity of isobutylene, the catalysts produce high-oxidation products, such as carbon dioxide and carbon monoxide, which correspondingly reduces the yield of methacrylic products.

One catalytic composition exists in which the active part contains molybdenum, tellurium and iron oxides, partly or totally combined in the form of iron telluromolybdate, or iron and tellurium. This active substance, deposited on 15 to 75% weight of a standard carrier such as kaolin, alumina, kieselguhr or silica, contains 0.1 to 10 moles of $TeO_3$ for 0.1 to 1 mole of $Fe_2O_3$ and 1 mole of $MoO_3$. This catalyst gives excellent results when used to obtain acrylonitrile by ammonoxidation of propylene.

The present inventors have used this and other catalytic compositions in ammonoxidizing isobutylene to obtain methacrylonitrile. Results showed that the isobutylene conversion rate, namely the ratio between the number of moles of isobutylene disappearing and the number of moles originally added, was around 65%, but the reaction involved too high an oxidation level, producing not only methacrylonitrile but also large amounts of carbon dioxide and carbon monoxide. The methacrylonitrile yield was barely 20%.

An isobutylene molecule is much more reactive than a propylene molecule so that the catalyst used to ammonoxidize isobutylene to obtain methacrylonitrile has to be extremely selective. This is not the case with the catalyst already mentioned, containing molybdenum, tellurium and iron oxides, which despite good isobutylene conversion, offers poor methacrylonitrile selectiveness. In their research into isobutylene ammonoxidation of isobutylene, the inventors have found a new catalyst containing molybdenum, tellurium and iron oxides, with much higher methacrylonitrile selectiveness than other similar catalysts.

The new catalyst, used in preparing methacrylonitrile by ammonoxidizing isobutylene in the presence of oxygen and ammonia, contains molybdenum, tellurium and iron oxides in its active phase, in the proportions of 1 to 15% weight of $MoO_3$, 25 to 50% weight of $Fe_2O_3$, and 45 to 70% weight of $TeO_3$. This active phase may be combined with a standard porous carrier, such as kaolin, alumina, kieselguhr or, preferably, silica, in the proportion of 15 to 75% of the total weight of the catalytic composition. These proportions of $MoO_3$, $TeO_3$ and $Fe_2O_3$ give the best conversion and methacrylonitrile yields, as is shown in Table 1 and the accompanying triangular diagrams, FIGS. 1 and 2. These results show that the best proportions of each of the active oxides in the total weight of oxides are 2 to 6% $MoO_3$, 36 to 48% $Fe_2O_3$, and 54 to 60% $TeO_3$. These catalytic compositions are prepared in the standard way, by impregnating the carrier with the oxides, or coprecipitating the oxides onto the carrier. The first method consists of using a preformed carrier, and adding a solution of the oxides. The solution and carrier are stirred vigorously and the composition is dried at around 120° C.

The catalyst can also be prepared by coprecipitating the oxides on the actual carrier, which is in the form of a gel, by adding a given quantity of molybdic acid, telluric acid and iron nitrate to a silica base. The mixture is dried at about 120° C. for 24 hours, and then roasted at 450° C. for 24 hours.

The ammonoxidation of isobutylene into methacrylonitrile is performed as in the previous art, by passing a mixture of isobutylene, oxygen and ammonia over the catalyst, and collecting the reaction products at the outlet.

The isobutylene may be pure, but it can also be diluted with hydrocarbons that remain inert during the reaction.

The proportion of isobutylene can vary widely, being generally between 1 and 15%, and preferably 3 and 7%, of the reaction mixture. The ratio of ammonia to isobutylene is between 0.8 and 1.5.

The molar ratio of oxygen to isobutylene entering the reactor is between 1 and 5, and preferably 1.5 and 3. The molecular oxygen may be added in the form of oxygen, or oxygen diluted with an inert gas such as nitrogen. Preference is given to air, which should contain from 5 to 50% water vapor.

The reaction temperature is between 300 and 600° C., and preferably 350 and 500° C.

In applying a catalyst as in this invention to the ammonoxidation of isobutylene to produce methacrylonitrile, the length of contact between the mixture of hydrocarbons, oxygen and ammonia and the catalytic composition can vary considerably, generally ranging from about 0.5 to 15 seconds, and preferably 1 to 6 seconds.

The process may be carried out in two ways. One consists of performing the reaction in a reactor with a fixed bed of catalyst, over which the gas passes, the reaction products being collected at the outlet. The second makes use of a fluid-bed reactor, using standard techniques. The total flow of reagents in fixed-bed or fluid-bed reactors can vary widely, from 0.1 to 10 cubic Nm. per kg. of catalyst per hour, and preferably 0.5 to 2 cubic Nm. per kg. per hour.

The invention is illustrated by, without being confined to, the following examples.

EXAMPLES 1 TO 17

These tests were designed to study the effect of the relative proportions of iron, molybdenum and tellurium oxides on the methacrylonitrile yield. Operating conditions (contact time, molar ratio of oxygen to isobutylene, and of ammonia to isobutylene) were identical, and the temperature was regulated so that the oxygen conversion rate was limited to 70%. This ensures comparable results, showing which catalytic compositions give the best methacrylonitrile yields.

17 catalysts were prepared, consisting of 50% active phase and 50% silica coprecipitated with the metal oxides.

Figure 2:
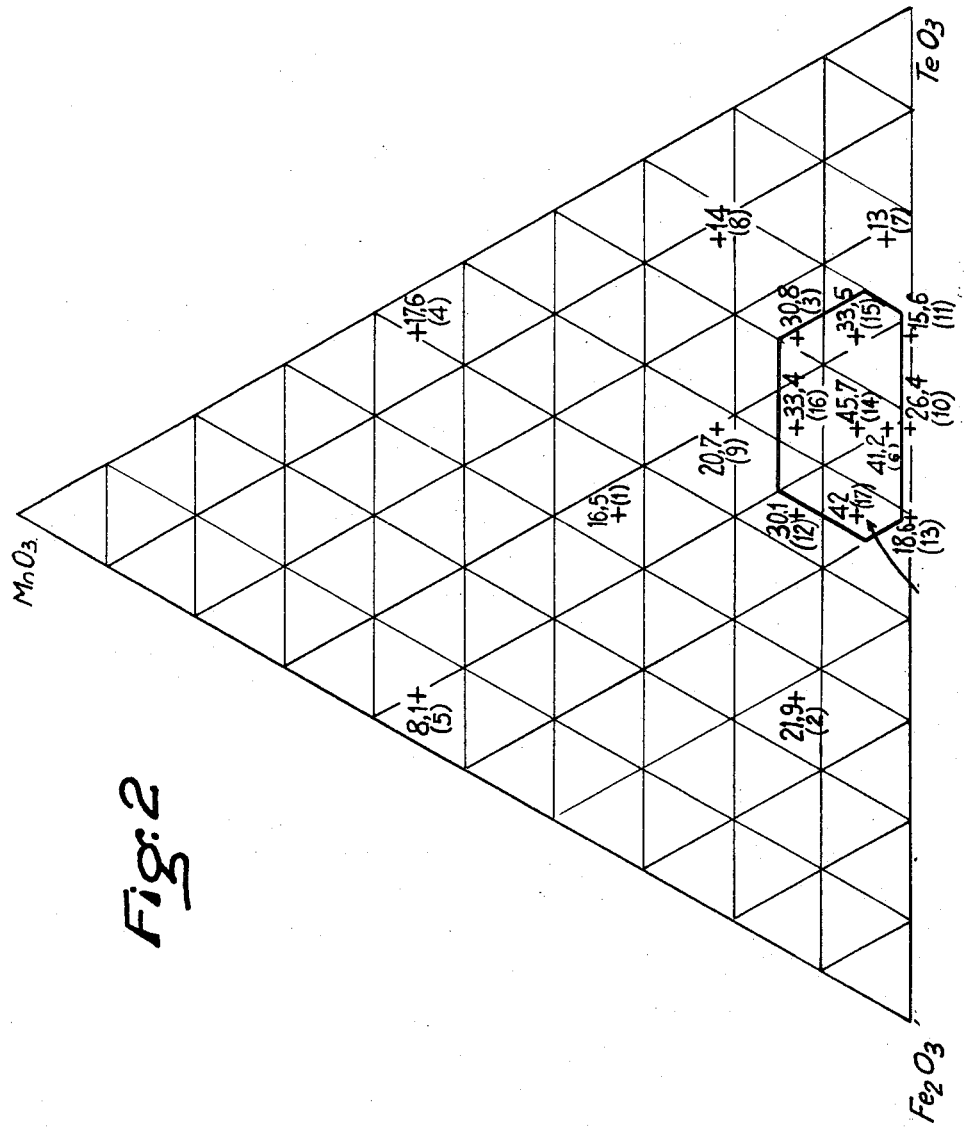

Table 1 gives the compositions of these 17 catalysts, which is also shown on the accompanying triangular diagram (FIGS. 1 and 2).

The operating conditions for the fixed-bed reactor tests were as follows:

contact time: 3 seconds;
isobutylene in reaction mixture: 5% moles;
oxygen/butylene molar ratio: 2.2;
ammonia/isobutylene molar ratio: 1.2.

Oxygen was added in the form of air, and the rest of the reaction mixture was water vapor. Isobutylene conversion rates and yields of methacrylonitrile and methacrylic products (methacrylonitrile+methacrolein) are given in Table 1. The best results are obtained with catalysts in which the active phase consists of approximately 3% weight of $MoO_3$, 28% weight of $TeO_3$, and 18% weight of $Fe_2O_3$, in relation to the total catalytic composition including carrier.

In these examples, the temperatures required to obtain 70% oxygen conversion range from 328 to 372° C. FIG. 1 shows the equal-yield curves for methacrylonitrile, for 70% oxygen conversion, in relation to given proportions of $MoO_3$, $Fe_2O_3$ and $TeO_3$. FIG. 2 also shows the methacrylonitrile yield for 70% oxygen conversion, for the particular points corresponding to the catalytic compositions shown in Table 1, with the number of the catalyst in brackets, and the claimed zone of recommended proportions of $MoO_3$, $Fe_2O_3$ and $TeO_3$ being bounded by the hexagon.

Higher methacrylonitrile yields can be obtained by raising the temperature or increasing the length of contact, to ensure higher reagent conversion rates.

EXAMPLE 18

A catalyst was prepared, similar to that of catalyst No. 14 containing 50% weight of silica, 3.6% weight of $MoO_3$, 27.3% weight of $TeO_3$ and 19.1% of $Fe_2O_3$.

The reagents were added as follows, to a fixed-bed reactor, at an average temperature of 375° C.:

isobutylene: 50 normal litres/hour/kg. of catalyst;
ammonia: 60 normal litres/hour/kg. of catalyst;
air: 572 normal litres/hour/kg. of catalyst;
water vapor: 318 normal litres/hour/kg. of catalyst;

The following results were obtained after 150 hours:

|  | Percent |
|---|---|
| Isobutylene conversion | 86 |
| Methacrylonitrile selectiveness | 67.1 |
| Methacrolein selectiveness | 5.5 |
| Acetonitrile selectiveness | 3.1 |
| Acrolein selectiveness | 0.5 |
| $CO_2$ selectiveness | 17.5 |
| CO selectiveness | 1.7 |
| HCN selectiveness | 4.6 |
| Yield of methacrylonitrile | 57.7 |
| Yield of methacrylic products | 62.5 |

EXAMPLE 19

In this test, a catalyst with an active phase very similar to those of catalysts Nos. 14 and 18 was used. The amount of active matter was 80% instead of 50%, however, the rest consisting, as before, of silica.

The catalyst contained 6.65% weight of $MoO_3$, 44.7% weight of $TeO_3$, 28.95% weight of $Fe_2O_3$, and 20% weight of silica.

It was placed in a tubular fixed-bed reactor, at an average temperature of 370° C.

The reagents were added as follows:

isobutylene: 50 normal litres/hour/kg. of catalyst;
ammonia: 60 normal litres/hour/kg. of catalyst;
air: 572 normal litres/hour/kg. of catalyst;
water vapor: 365 normal litres/hour/kg. of catalyst;

The test was continued for 1,200 hours, the following results being observed over the last 600 hours:

Percent molar conversion rate:

| | |
|---|---|
| Isobutylene | 87.5 |
| Oxygen | 75.5 |
| Ammonia | 62 |

Percent molar selectiveness rates:

| | |
|---|---|
| Methacrylonitrile | 74.6 |
| Methacrolein | 9.5 |
| Acetonitrile | 1.8 |
| Acrolein | 0.4 |
| $CO_2$ | 9.3 |
| CO | 0.8 |
| HCN | 3.7 |

Percent molar yields:

| | |
|---|---|
| Methacrylonitrile | 65.2 |
| Methacrylic products | 73.5 |

TABLE 1.—RATE OF ISOBUTENE/METHACRYLONITRILE CONVERSION FOR 70% OXYGEN INPUT REACTION RATE

| Catalyst number | 1 | 2 | [1] 3 | 4 | 5 | [1] 6 | 7 | 8 | 9 | 10 | 11 | 12 | 13 | [1] 14 | [1] 15 | [1] 16 | [1] 17 |
|---|---|---|---|---|---|---|---|---|---|---|---|---|---|---|---|---|---|
| Percent weight of $MoO_3$ in active phase | 33.4 | 12.20 | 12.20 | 54.5 | 54.5 | 2.1 | 2.1 | 22.4 | 22.3 | 0 | 0 | 12 | 0 | 6.2 | 6.2 | 12.2 | 6.1 |
| Percent weight of $TeO_3$ in active phase | 33.4 | 25.6 | 62.2 | 41.0 | 4.5 | 58.4 | 76 | 66 | 48.3 | 59.0 | 68.4 | 44 | 50 | 56.4 | 65.2 | 53.4 | 47.0 |
| Percent weight of $Fe_2O_3$ in active phase | 33.2 | 62.2 | 25.6 | 4.5 | 41.0 | 39.4 | 21.9 | 11.6 | 29.4 | 41.0 | 31.6 | 44 | 50 | 37.4 | 28.6 | 34.4 | 47.0 |
| Temperature in ° C | 328 | 337 | 365 | 362 | 332 | 362 | 365 | 360 | 337 | 372 | 367 | 341 | 372 | 354 | 366 | 349 | 353 |
| Percent isobutene conversion | 46.5 | 49.5 | 63.5 | 59.5 | 40.8 | 60 | 48 | 48 | 48.5 | 51.3 | 46.1 | 55 | 44.5 | 66 | 61 | 58.3 | 62.3 |
| Percent methacrylonitrile yield | 16.5 | 21.9 | 30.8 | 17.6 | 8.1 | 41.2 | 13 | 14.0 | 20.7 | 26.4 | 15.6 | 30.1 | 18.6 | 45.7 | 33.5 | 33.4 | 42 |
| Percent methacrylic product yield | 17.7 | 23.1 | 38 | 28.3 | 8.1 | 46.5 | 19.1 | 22.8 | 22.7 | 29.6 | 18.2 | 31.8 | 20.4 | 49.6 | 38.3 | 36.5 | 44 |

[1] Catalysts of the invention.

What is claimed is:

1. A process for the preparation of methacrylonitrile which comprises oxidizing isobutylene at a reaction temperature between 300 and 600° C. in the presence of ammonia and a catalyst, wherein said catalyst consists of 1–15 weight percent of $MoO_3$, 25–50 weight percent of $Fe_2O_3$, and 45–70 weight percent of $TeO_3$.

2. The process of claim 1 wherein said catalyst consists of 2–6 weight percent of $MoO_3$, 36–48 weight percent of $Fe_2O_3$ and 54–60 weight percent of $TeO_3$.

3. A process according to claim 1 in which the gas mixture passing over the catalyst contains 1–15 volume percent of isobutylene, 0.8–22.5 volume percent of ammonia, 1–75 volume percent of oxygen and the rest consisting of inert gases, in which the reaction temperature is between 300°–600° C., and in which the contact time is between 0.5 and 15 seconds.

4. A process according to claim 1, in which the catalyst is deposited on 15 to 75% weight of a carrier.

5. A process according to claim 1, in which the gas mixture passing over the catalyst contains 1 to 15% volume of isobutylene, 0.8 to 22.5% volume of ammonia, 1 to 75% volume of oxygen, the rest consisting of inert gases.

6. A process according to claim 5, in which the inert gas is at least one of nitrogen and water vapor.

7. A process according to claim 1, in which the reaction temperature is between 350 and 500° C.

8. A process according to claim 1, in which the contact time is between 0.5 and 15 seconds.

9. A process according to claim 8, in which the contact time is between 1 and 6 seconds.

References Cited

UNITED STATES PATENTS

| | | | |
|---|---|---|---|
| 3,392,189 | 7/1968 | Eden | 260—465.3 |
| 3,641,102 | 2/1972 | Reulet et al. | 260—465.3 |
| 3,686,265 | 8/1972 | Reulet et al. | 260—465.3 |

JOSEPH P. BRUST, Primary Examiner

U.S. Cl. X.R.

252—439